US005976867A

United States Patent [19]

Fliermans

[11] Patent Number: 5,976,867

[45] **Date of Patent: *Nov. 2, 1999**

[54] USE OF SEROSPECIFIC BIOCARRIER COMPOSITIONS FOR ENHANCED BIODEGRADATION AND BIOREMEDIATION OF GROUNDWATER

[75] Inventor: Carl B. Fliermans, Augusta, Ga.

[73] Assignee: The United States of America as represented by the Department of Energy, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/583,151

[22] Filed: Dec. 28, 1995

Related U.S. Application Data

[63] Continuation-in-part of application No. 08/246,261, May 19, 1994, abandoned.

[51] Int. Cl.[6] .................................................. B09B 3/00

[52] U.S. Cl. ...................... 435/262.5; 435/145; 435/176; 435/252.1; 435/288.1; 530/387.1

[58] Field of Search ............................... 435/288.1, 174, 435/176, 262.5; 530/252.1, 387.1

[56] References Cited

U.S. PATENT DOCUMENTS 5,024,949 6/1991 Hegeman et al. ...................... 435/262
5,045,201 9/1991 Dubois et al. ...................... 210/502.1
5,139,933 8/1992 Green et al. ............................ 435/732

OTHER PUBLICATIONS

Martin et al. Environ. Sci. Technol. vol. 26:1053–1058, May 1992.

Seppanen, Harri, Biological Treatment of Groundwater on Basins with Floating Filters–II. The Role of Microorganisms in Floating Filters, 1988, pp. 185–186.

Klibanov, Alexander and Huber, Jonathan, Application of Immobilized Hydrogenase for the Detritiation of Water pp. 1537–1551, 1990.

*Primary Examiner*—Christiana Y. Chan
*Assistant Examiner*—Patrick J. Nolan
*Attorney, Agent, or Firm*—James Durkis; Harold Dixon; William R. Moser

[57] ABSTRACT

A composition and method for using the composition for degrading pollutants in-situ. The composition comprises a biocarrier coated with an antigen-specific antibody that attracts and binds pollution-degrading antigens. The biocarrier, which is preferably in the form of glass microspheres, is coated with one or more strains of antibody. The antibody may be placed into the ground in or near the source of pollutants where it may attract antigens present and bind them, or the antibodies may be first exposed to the antigens and then placed in the ground. Alternatively, the coated biocarriers may be used to degrade pollutants in ground water pumped to the surface and through a biofilter containing the biocarriers. The remediated groundwater can then be returned to the soil.

11 Claims, 1 Drawing Sheet

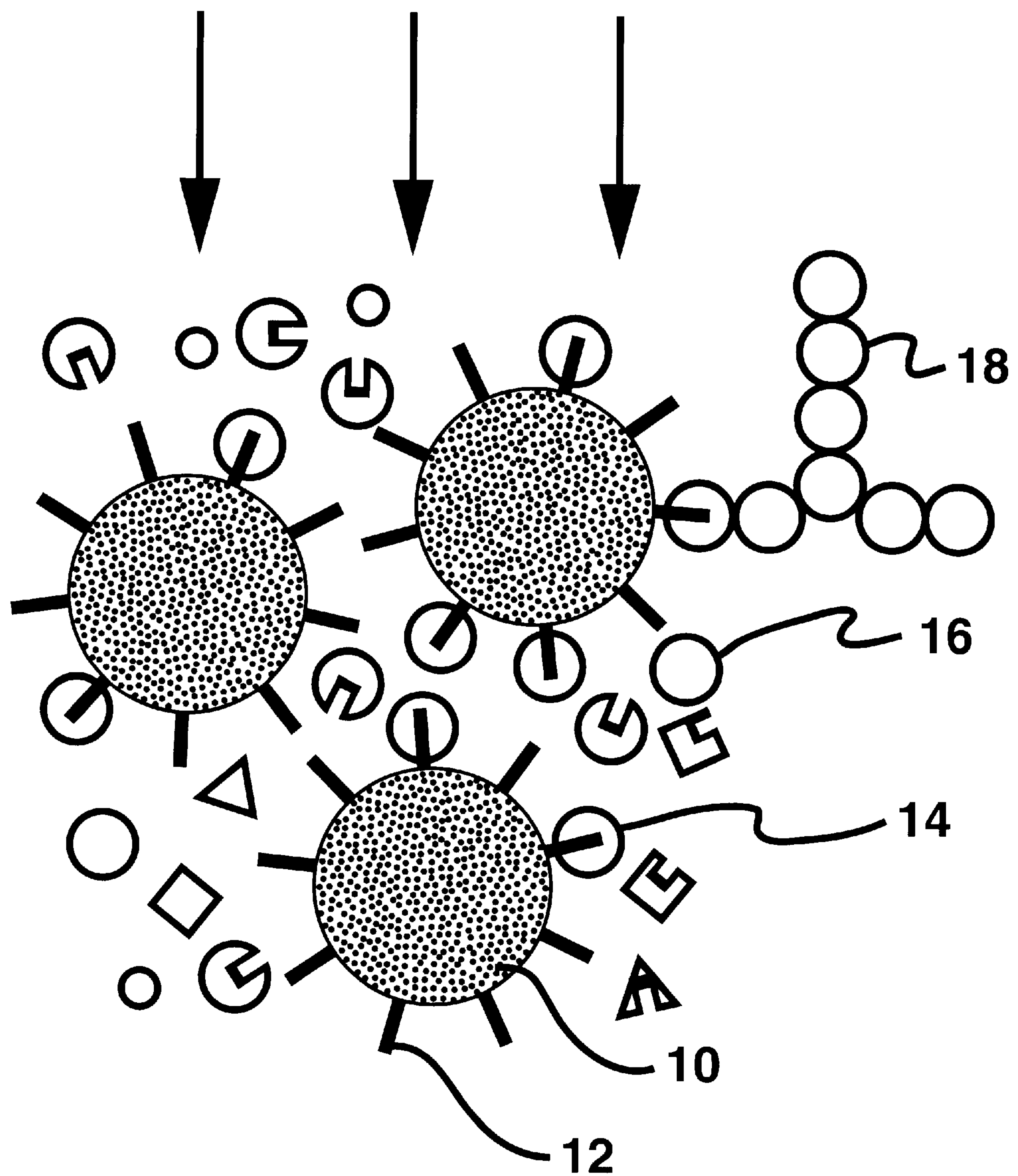
18
16
14
10
12

USE OF SEROSPECIFIC BIOCARRIER COMPOSITIONS FOR ENHANCED BIODEGRADATION AND BIOREMEDIATION OF GROUNDWATER

RELATED APPLICATIONS

This application is a continuation-in-part of application Ser. No. 08/246,261 filed on May 19, 1994 now abandoned.

The United States Government has rights in this invention pursuant to Contract No. DE-AC09-88SR18035 between the U.S. Department of Energy (D.O.E.) and Westinghouse Savannah River Company.

BACKGROUND OF THE INVENTION

1. Field of the Invention

This application relates generally to a process of biodegradation of groundwater pollutants.

2. Discussion of Background

Bacterial remediation of soil and groundwater contaminants are well known in the art. Hegeman et al in U.S. Pat. No. 5,024,949, incorporated herein by reference, teaches bacterial isolation, selection, and amplification techniques for providing bacterial cultures useful in the degradation of chlorinated aliphatic hydrocarbons. The teachings of Hegeman et al are applicable to other soil or water borne contaminants where bacteria are known to convert or degrade a contaminant to safe or less harmful metabolic byproducts. It is well known in the art to adopt bacterial selection protocols to identify and culture strains of bacteria with a degradation (metabolite) preference for a single chemical species, such as TCE, even when similar chemical hydrocarbon species are also present.

Heretofore, the use of bacterial agents to remediate groundwater and soil contaminated sites have been largely confined to passing contaminated water and soil through incubation tanks housing cultures of specified bacteria under optimal pH, temperature, and nutrient conditions. This treatment protocol is capital and labor intensive, requires frequent monitoring, and long periods of time.

In situ treatment of groundwater and soil contaminants with bacterial agents is also known. However, in situ treatments typically employ the introduction of controlled levels of nitrogen, phosphorus, air, and other nutrients in an effort to stimulate bioremediation. The introduction of nutrients often generates excessive growth and plugging of access wells and injection points. Further, the bacterial bloom which results is often nonspecific which may dilute the presence and activity of the desired bacterial agent, or promotes bacterial activity which produces unwanted byproducts (such as vinyl chloride) as opposed to a preferred metabolic degradation pathway. In addition, the nutrient supplementation occurs on a rather large scale and is therefore costly.

Accordingly, there is room for improvement and variation in the art of bioremediation processes and treatment protocols.

SUMMARY OF THE INVENTION

It is therefore an object of this invention to provide a novel and improved process for enhancing the efficiency of in situ or above ground bioremediation of groundwater and soil contaminants.

It is another object of this invention to provide a process for initiating and maintaining colonies of selected bacteria which function as biocatalytic sites for bioremediation of contaminants.

It is yet another object of this invention to provide a process for selectively increasing the biological activity of desired bacterial agents, with minimal promotion of other, non-selected agents.

These as well as other objects of the invention are provided by a process of degrading water-borne pollutants comprising:

providing a bacterium having useful degradation properties of a pollutant; providing a biocarrier complex comprising an external housing; an inert matrix material contained within the housing and having a large surface area to volume ratio; a plurality of bridge proteins selected from the group consisting of a polyclonal antibody, a monoclonal antibody, and lectins, the bridge proteins being bound to the matrix; and a plurality of a single strain of the bacterium attached to a binding site of at least one bridge protein; multiplying the bacteria within the housing; contacting the biocarrier complex with a liquid-borne pollutant; and degrading the pollutant by the metabolic activity of the bacteria.

BRIEF DESCRIPTION OF THE DRAWINGS

FIG. 1 is an illustration of a preferred microsphere/antibody/antigen complex in accordance with this invention.

DETAILED DESCRIPTION

A process is provided which facilitates the bioamplification of a desired bacterial agent and its subsequent use in bioremediation of contaminated groundwater and soil.

The present invention takes advantage of highly selective and specific antibody or lectin binding properties to selectively engage and subsequently amplify useful bacteria on and/or within a serobiocarrier. The serobiocarrier and associated bacteria are then used to remove contaminants from a waste stream such as polluted groundwater, soil, or industrial waste streams. The selectivity and compartmental presentation of specialized bacterial agents also facilitates the treatment of mixed waste streams.

Selection of a microorganism

In accordance with carrying out this invention, it is necessary to identify and isolate useful microorganisms, such as a bacterium, which demonstrate useful degradation properties for a pollutant or contaminant of interest. One approach is to use previously identified and cultivated pure strains of bacteria having the known detoxifying properties of interest. A wide variety of bacterial strains and mutants having useful properties have been reported in the literature. Many of these strains are available through research depositories or by request of individual researchers. Further, the isolation and growth protocols through which the strains were initially isolated, permit those having ordinary skill in the art to duplicate the isolation efforts and obtain their own useful strains from wild cultures. For instance, the methods of Hegeman et al enable the isolation of useful bacteria from natural populations. Simple modification of the selection media would enable the isolation of other useful bacteria by varying the hydrocarbon (contaminant) provided as the carbon source during the selection protocol.

For the purposes of this invention, techniques to obtain bacterial strains having biological properties of interest are well known and can be utilized in subsequent steps set forth below.

As described in Hegeman, a suitable selection assay and protocol provides useful strains of field isolated Pseudomonas species capable of degrading trichlorethylene (TCE) and using a gasoline mixture as an additional carbon source. In accordance with this invention, it is preferred to field isolate, in combination with a suitable assay, bacteria strains demonstrating useful degradation properties of a pollutant of interest. Field isolation is particularly useful where a plurality of pollutants are encountered. Any bacteria isolated from a mixed waste site will be expected to demonstrate a higher tolerance for the contaminants present, irrespective of any single contaminant which the bacterium may degrade.

Antibody production

An essential aspect of this invention is the ability to provide a bridge molecule such as a polyclonal, monoclonal or monoclonal mixture of antibodies having binding specificity for an antigen(s) present on the surface of the selected bacterium or bacteria. The production and screening of polyclonal and monoclonal antibodies is well known as are purification techniques such as affinity column purification. As used here, antibodies refer to those specific proteins having specificity and binding capabilities for a bacterium of interest. Since the bacterium can be provided in pure cultures, a generalized polyclonal antibody which recognizes and binds outer membrane proteins or other constituents of Pseudomonas species or other bacterium of interest is easily derived.

Antibody attachment to a carrier

It is also well known to adsorb or bind antibodies to a variety of matrixes which preserves the antigen recognition and binding properties of the antibody. The antibodies can be bound to a variety of inert substrates (carriers) including latex, agarose, plastics and polystyrene materials which may in a variety of useful forms such as microspheres, beads, or fine tubing. The carrier material can in turn be further formed into a variety of useful high surface area configurations such as filters, injection foams, or membranes. A variety of matrix materials are available and pretreated to adsorb or bind proteins, such as antibodies or lectins, upon incubation of the matrix material with the protein.

Preferably, the final concentration of the carrier provides a high-surface area for carrying bacteria while maintaining a sufficient flow rate of groundwater or other waste stream. As seen in FIG. 1, glass or polystyrene carrier beads or microspheres 10 are coated with a suitable antibody 12 for recognizing and binding selected bacteria 14 which continue to grow and form colonies 18. Directional arrows in FIG. 1 illustrate the liquid flow direction which can occur between the coated beads. Nonspecific bacteria, proteins and other materials 16 do not bind to the substrate 10. Though not illustrated, individual beads can further define a plurality of channels and passages which traverse the beads, thereby increasing the surface area of available for selective binding, bead density, and improving the flow rate characteristics of the final matrix.

At its simplest embodiment, a suitable biocarrier matrix is provided in the form of a cylindrical column or other housing containing a supply of packed beads or microspheres having the antibody and associated bacteria bound thereto. An alternative embodiment of the carrier envisions providing up to 25% of uncoated beads to the matrix. While the percentage of uncoated beads can vary, the use of the uncoated beads provides a suitable substrate for the expansion of bacterial colony growth and thereby extends the useful life of the biocarrier.

As set forth in greater detail below, an antibody such as a rabbit polyclonal antibody directed towards a surface antigen of a bacterial envelope can be directly bound to the inert carrier. For greater binding activity and specificity, a goat-anti-rabbit (GAR) serum directed against rabbit IgG proteins is initially bound to the carrier. Once bound and blocked, the carrier is then exposed to the rabbit polyclonal which is bound to the GAR antibodies.

For example, affinity columns, using a variety of matrix materials, carrying conjugated antibodies are widely used to bind antigens and are known to separate and bind whole cells. ELISA and other diagnostic assays make similar use of bound antibodies to further react with specific antigens.

Forming an antigen-specific serobiocarrier

Once the carrier is coated with specific antibodies directed towards suitable antigens, i.e. sites accessible on the outer surface of the appropriate bacterium, the cultivated bacteria are passed through the carrier matrix in keeping with established protocols to promote and maintain the antigen binding to the antibody.

Alternatively, the serobiocarrier having the attached antibodies of interest can be used to isolate and sequester specific bacterium naturally present in the groundwater and magnify their concentration to form a useful, viable complex of active and concentrated bacteria.

Using the serobiocarrier for remediation of contaminants

The serobiocarrier is suitable for bioremediation in several diverse embodiments. Broadly stated, the biocarrier is positioned either in situ or as part of a remote processing unit such that a waste stream such as polluted groundwater passes through the biocarrier. The scale and volume of treatment is limited by the physical flow rate dimensions of the carrier and the treatment capacity of the carrier. The size and capacity of a biocarrier has practical economic considerations of material cost and the cost and availability of the antibodies.

A key feature of this invention is the ability to provide an initial functional biomass or nucleating site of a desired strain of bacterium. The biocarrier provides the initial specific attraction to bind the bacteria of interest. The binding of living bacterial cells does not interfere with the ability of the bacteria to continue to grow and multiply.

The density of the initial bacteria on the biocarrier can be controlled by varying the initial antibody concentration present on the carrier and/or by limiting by time or concentration of exposure of bacteria to the carrier-antibody structure. Maintaining the initial density at less than a maximum allows room for bacterial growth, expansion, and colonization of the matrix during the processing of the pollutant. This feature is believed important to prevent a sudden bloom of bacterial growth which would impede the flow of the waste stream through the biocarrier matrix. Likewise, the inclusion of unbound carrier beads or other matrix material maintains the useful flow rates for extended periods of time.

It is well understood among those having skill in the art that the conditions for either in situ or above ground remediation are not conducive to long term stability of the carrier-antibody-antigen binding or maintaining a pure biological culture. However, a key aspect of the present invention is the ability to provide a concentrated supply of bacteria having useful degradation properties. Once bound, bacteria are further cultivated under controlled conditions until a log growth phase is obtained. The rapid growth of the bacteria will colonize the biocarrier, the colonization taking advantage of the normal growth habitat and morphology of the soil derived bacteria which tend to sorb to and colonize any available substrate.

Accordingly, even under environmental conditions which tend to degrade or disfavor the antibody/antigen interaction, the growing bacteria will adhere to the matrix of the biocarrier and maintain the active biological action of the biocarrier complex. It is the biologically active biocarrier complex which is useful in the present invention.

In situ remediation can be provided by suspending the biocarrier within the filter packing, typically comprising washed sand, along the screen zone of a well. A housing surrounding the biocarrier can be equipped with a simple gear mechanism to facilitate rotating the biocarrier to increase the amount of groundwater/biocarrier contact as the contaminated waste water flows through the porous biocarrier matrix in response to the gradient flow created by the extraction well or groundwater flow. The biocarriers are positioned and interact with the screen zone of an extraction well such that any withdrawn ground water must first pass through the biocarrier prior to being extracted. Accordingly, the housing outlet of the biocarrier(s) should engage the screen zone portions of the well so that all liquid flow is through the biocarrier complex. To this end, groundwater funnels and gates can be used.

A plurality of biocarriers can also be suspended the length of an extraction well shaft to treat the waste water as the water is extracted. The withdrawal rate of the groundwater is dictated by the efficiency of the degradation of the pollutant of interest. In a system of contaminated groundwater, it is not uncommon to have a mixture of chemical wastes present. While it is believed possible to provide biocarrier complexes directed to separate pollutants present, the present invention is also useful in treating a single contaminant during the withdrawal of the waste stream, thereby simplifying the above ground remediation of the remaining contaminants.

The biocarrier complexes can also be used for above ground remediation as part of a bioreactor. The biocarrier complex is supplied in the form of a filter foam or similar matrix through which the waste stream passes and/or recirculates. Again, the biocarrier filter complex can be periodically rotated about an axis to increase the interaction of the filter and contaminated liquid.

An advantage of the compact biocarriers is that nutrient supplements for maintaining the bacteria in an active growth state are more easily supplied. The nutritional supplement such as phosphorous, nitrogen, or supplemental hydrocarbon sources can be directed via a separate feed line or conduit to deliver nutrients adjacent the intake portions of the biocarrier. It is much more cost effective to treat well defined zones with supplements for enhancing bacterial growth as opposed to larger scale treatments of an entire contamination plume.

In conjunction with the above ground bioreactors, the biocarrier complex of the present invention simplifies the bioreactor design and operation. By concentrating the biological activity within discreet biocarriers, the reaction parameters of pH, nutrient concentration, temperature, and substrates can be more easily regulated within the compact biocarrier. As a result, the entire treatment tank does not require maintenance at optimal growth conditions. Further, the self-contained biocarrier complexes facilitate the use of diverse bacterial organisms directed towards different chemical contaminants. As a result, it is possible to maintain the plurality of different action biocarriers in conjunction with a single above ground remediation tank. As a result, simultaneous reactions can occur which may otherwise be incompatible or inefficient if duplicated on a large scale tank application.

An additional in situ treatment protocol is made possible by using the microbead/antibody/bacteria complex. A slurry of suspended microspheres carrying the bacteria can be injected or introduced to soil substrates which are otherwise difficult to treat. For instance, fractured rock will typically retain contaminants which are difficult to remove. The biocarrier beads enable a mechanical delivery system of beneficial bacteria attached to the small carrier. The sizes of individual microsphere can vary from less than 20 um in diameter on up and have a relative density range from 0.5 to 1.5. As a result, individual beads respond to the fluid gradient flow of the region where introduced as well as migration based upon bead density. As a result, active bacteria are transported by the small microspheres to rock fractures and crevices which introduce the desired bacteria to the target substrate. As previously discussed, the carrier complex does not persist indefinitely. However, the duration is sufficient to permit transport of useful bacteria to the target areas via the dispersal of the microsphere microspheres, and the establishing of habitat niches where these selected bacteria dominate the microbial population.

EXAMPLE 1

TCE Degradation by Pseudomonas

A culture of TCE degrading bacteria Pseudomonas SP. $ALS_3$ as field isolated according to the methods of Hegeman et al. is obtained and cultivated on liquid mineral medium (Jones and Edington, J. Gen. Microbiology; 52 (1968) and enriched with 0.2 ml unleaded gas and 20 ul TCE (Hegeman) . Alternatively, useful bacteria cultures are obtained from the American Type Culture Collection (ATCC) having deposit numbers 53817 or 53819. Active cultures of the $ALS_3$ are maintained in active log growth phase on liquid media.

Polyclonal antibodies directed against the $ALS_3$ bacteria are raised in rabbits by periodic injections of attenuated (heat killed) $ALS_3$ cells in combination with Freund's oil and water adjuvant. A suitable protocol for antibody production and purification is set forth in Hudson, L.; Hay, F. C *Practical Immunology*, second edition Oxford Engineering: Blackwell, 1980; and Eisen, H. N. *Immunology* third edition New York: Harport Row 1981. Numerous variations and protocols are well known in the art for the production of antibodies. The specificity and binding capabilities of the raised antibodies are visually demonstrated by conjugating the polyclonal antibody to fluorescein isothiocyanate (FITC). Upon incubation of $ALS_3$ bacteria with the FITC label antibody, UV microscopy is used to visualize the binding of the labeled antibody to the $ALS_3$, cells.

The polyclonal antibody is used to coat polystyrene or glass microspheres. A variety of binding agents suitable for affinity columns are commercially available to prepare the matrix material for binding the antibody. Such fixing agents and antibody coating protocols are well known in the art as is the fact that some matrix materials, such as polystyrene, will adsorb antibodies which in turn is used to bind or collect antigens.

The antibody bound microspheres are then washed and incubated with a log phase suspension culture of $ALS_3$ bacteria in a culture vessel. A rotary shaker is used to maintain mixing and movement of the bacteria culture relative to the microspheres. Microspheres are incubated the presence of the $ALS_3$ bacteria at optimum temperature for one hour or overnight at 4° C. followed by three rinses with sterile liquid media.

The microsphere/antibody/bacterium structure can then be introduced to a sterile housing having at least one inlet and one outlet which are sealed with glass wool or similar material which prevents loss of the beads yet still permits the passage of liquids. The housing preferably defines a series of internal baffles which direct liquid flow in the circuitous yet uniform pattern through the microbeads. Sterile liquid bacteria culture media is used to incubate the microsphere/bacteria units and encourage growth and colonization of the bacteria on to the microspheres. The resulting functional unit of the housing with active bacterial growth is referred to as the biocarrier complex.

A plurality of biocarrier complexes are positioned in situ adjacent to and in communication with a screen zone of an extraction well. Groundwater contaminated with TCE is drawn into one or more biocarrier complex inlets, the groundwater and TCE being exposed to the active $ALS_3$ bacteria. The degradation rate is controlled in part by concentration of other hydrocarbons, temperature, pH, and available nutrients. Optional supply lines are provided to deliver nutrients to the area surrounding the biocarrier complex, the nutrients facilitating the bacterial activity of the biocarrier complex. Since the active reaction zones provided by the high surface area biocarrier complex is limited in size, it is possible to use a continuous closed loop conduit as a heat exchanger for elevating the local temperature of the adjacent biocarrier environment to facilitate the remediation process. The efficiency of degradation is verified by chromatographic techniques or other measurements for determining TCE levels in the treated groundwater. This can also be used in a funnel and gate mechanism used to direct groundwater to a defined zone for remediation.

EXAMPLE TWO

Above Ground Remediation

A biocarrier complex is provided as set forth in example one. The complex, or a series of complexes, is placed in communication with an above ground treatment vessel for processing waste water contaminated with TCE or other hydrocarbons. The vessel contents are continuously passed through the biocarrier complex, exposing the TCE to the $ALS_3$ bacteria within the complex. The TCE levels are periodically measured until substantially all the TCE is degraded as measured with conventional chromatographic techniques.

Degradation is enhanced by the introduction of trace elements and nutrients to support the bacterial component of the biocarrier complex. Temperature and pH are also adjusted to optimize the biological degradation of TCE.

If desired, a separate set of biocarriers, comprising a different bacterium capable of degradation of a separate contaminate, can be provided. For instance, certain strains of *Pseudomonas stutzeri* are known to metabolize aromatic compounds such as isobutylbenzene and could be supplied in a biocarrier complex. Accordingly, it is possible to simultaneously process different waste in a treatment tank. Unlike conventional treatments where a broth of a bacterium culture is maintained throughout the entire vessel, the bacteria and biological activity is concentrated with the biocarrier matrix. This enables multiple strains of useful bacteria to remediate different wastes within the same tank.

Simultaneous processing of multiple wastes in a prior art broth type treatment tank is difficult in that mixed strain cultures are difficult to maintain at respective optimal concentrations since one strain or species tends to dominate the culture. The present invention enables diverse strains and even genera of bacteria to be functionally combined in the simultaneous processing of distinct contaminants.

It is understood that the biocarriers will generate a supply of bacteria which slough off and become part of the liquid waste stream being treated. The effect on the other biocarriers is believed to be minimal, since aseptic conditions are not required for the use of the biocarriers for remediation. The released cells will contribute to degradation of the respective pollutant outside the biocarrier and is therefor useful. As with conventional bioreactors, any undesired biological agents can be processed before the treated waste water is disposed by any of several permitted discharge options.

A variation of the above ground remediation is useful for Industrial out-fall and discharges of treated wastes as regulated through the National Pollution Discharge Elimination System (NPDES). Specific Biocarriers can be tailored to individual system contaminants to treat the waste to reach acceptable contamination levels prior to discharge.

EXAMPLE THREE

Landfill leachate processing

A biocarrier as provided in example one is useful in landfill leachate collection and recharge systems to degrade contaminants such as TCE, gasoline, and other hydrocarbons. Typically, landfills with approved liners use a leachate collection system to collect liquids which have accumulated at or near the bottom of the landfill. The leachate is then brought back to the surface and discharged where the leachate once again percolates through the landfill substrate. The recycling action of the leachate is useful in stimulating breakdown of many contaminants and helps stimulate aerobic breakdown of landfill wastes.

Some contaminants, such as TCE or other hydrocarbons for which biological remediation agents (bacteria) are known, can be bioremediated with a biocarrier complex. This is beneficial since TCE is often converted to a human carcinogen, vinyl chloride, under anaerobic conditions common to landfills. Processing the TCE from the leachate collection system, avoids the generation of a more hazardous material.

A biocarrier complex having an active $ALS_3$ culture is used to process the leachate to remove TCE. Initially, the leachate is tested for TCE levels since excessive concentrations are toxic to the $ALS_3$ bacterium. If needed, dilution of the leachate with water or nutritional supplements is performed to provide a tolerable TCE level within the leachate. The leachate stream is then passed through a biocarrier complex in the form of a vertical column, exposing the TCE to the bacteria for degradation. Since the leachate is continuously recycled, it is not necessary to process substantially all the TCE during the initial pass through the biocarrier complex which enables higher flow rates to be maintained. The discharge (sloughing) of bacteria from the biocarrier complex output is beneficial in that additional bacteria are introduced in situ which promotes further bioremediation.

As the degradation efficiency decreases for any application of the biocarriers, replacement with new carriers is desired. The old matrix can be collected and discharged in situ to introduce useful bacteria into the contaminated source.

Alternative Biocarrier Composition

While the above examples are given in reference to a matrix covalently bound to an antibody, it is believed that an equivalent biocarrier can be provided using plant lectins as the bridge molecule between the carrier material and the bacterium. Plant lectins are non-immunoglobulin proteins capable of specific recognition and reversible binding to carbohydrate moieties of complex carbohydrates. A variety of specific lectins are known to selectively bind and capture bacteria. Accordingly, it is possible to use a lectin which binds with the cell envelope of a bacterium to be used with the biocarrier matrix.

The properties, identity, isolation and attachment of lectins to inert matrix materials suitable for use as a biocarrier are well known within the art. Etzler, M. E. 1985. Plant Lectins: Molecular and biological aspects, In *Ann. Rev. Plant Physiology.* 36:209–34 Annual Review, Inc. Palo Alto; Goldstein, I. J. and C. E. Hayes (1978) in *Advances in Carbohydrate Chemistry and Biochemistry*, pp. 127–340. Academic Press. Lectins are believed useful alternatives to antibodies in that many lectins are associated with root bacterium interactions. Accordingly, soil conditions including pH, temperature, other biotic factors mimic the in situ conditions of the present invention. Therefor the lectins should permit a longer binding interaction to persist.

It will be apparent to those of skill in the art that various changes and substitutions can be made to the embodiments described herein without departing from the spirit and scope of the present invention as defined by the appended claims.

That which is claimed:

1. A process of degrading water-borne pollutants comprising:

providing a bacterium having useful degradation properties of a pollutant;

providing a biocarrier complex comprising:

an external housing;

an inert matrix material contained entirely within said housing and having a large surface area to volume ratio;

a plurality of bridge proteins selected from the group consisting of a polyclonal antibody, a monoclonal antibody, and a lectin, said bridge proteins being bound to said matrix; and a plurality of a single strain of said bacterium attached to a binding site of at least one bridge protein;

multiplying said bacteria within said housing;

placing said biocarrier complex below ground for the in situ treatment of a groundwater pollutant;

contacting said biocarrier complex with groundwater having a pollutant; and degrading said pollutant by the metabolic activity of said bacteria.

2. The process according to claim 1 wherein said contacting step further comprises introducing said groundwater having a pollutant to an inlet defined by said housing and maintaining a gradient flow of the groundwater through said matrix and in the direction of an outlet defined by said housing.

3. The process according to claim 1 wherein said step of providing a bacterium further comprises providing a bacterium capable of degrading TCE.

4. The process according to claim 1 wherein said placing step further comprises:

placing a plurality of said biocarrier complexes adjacent the screen zone of a well, an outlet portion of each said housing in fluid communication with said screen zone whereby the gradient flow into the well shaft passes through said biocarrier complexes.

5. The process according to claim 1 wherein said contacting step further comprises passing a contaminated waste stream of an above ground reaction vessel through said biocarrier complex.

6. The process according to claim 5 wherein said contacting step further comprises providing a first biocarrier complex having a first bacterial strain directed towards a first pollutant and providing a second biocarrier complex having a second bacterial strain directed towards a second pollutant and passing said waste stream through said first and said second complexes.

7. The process according to claim 1 wherein said step of providing a biocarrier complex further comprises:

supplying an inert matrix material comprising a plurality of microspheres.

8. The process according to claim 1 wherein said contacting step further comprises contacting a plurality of microspheres carried within said biocarrier complex, each said microsphere further carrying a plurality of said bacterium attached to said microsphere with said bridge protein.

9. The process according to claim 1, said process comprising the additional step of maintaining the contacting of said biocarrier complex with said pollutant for a period of time sufficient to allow degradation of said pollutant by the metabolic activity of said bacteria.

10. The process according to claim 9 wherein said multiplying step continues until at least a time when a log growth phase of the bacteria is obtained.

11. The process according to claim 9 wherein said contacting step is initiated at a time prior to the bacteria multiplying sufficiently to occupy substantially all of said large surface area of said inert matrix material.

* * * * *